B. E. BIGGER.
SEED CORN STRINGER.
APPLICATION FILED JAN. 31, 1914.
1,111,207.
Patented Sept. 22, 1914.
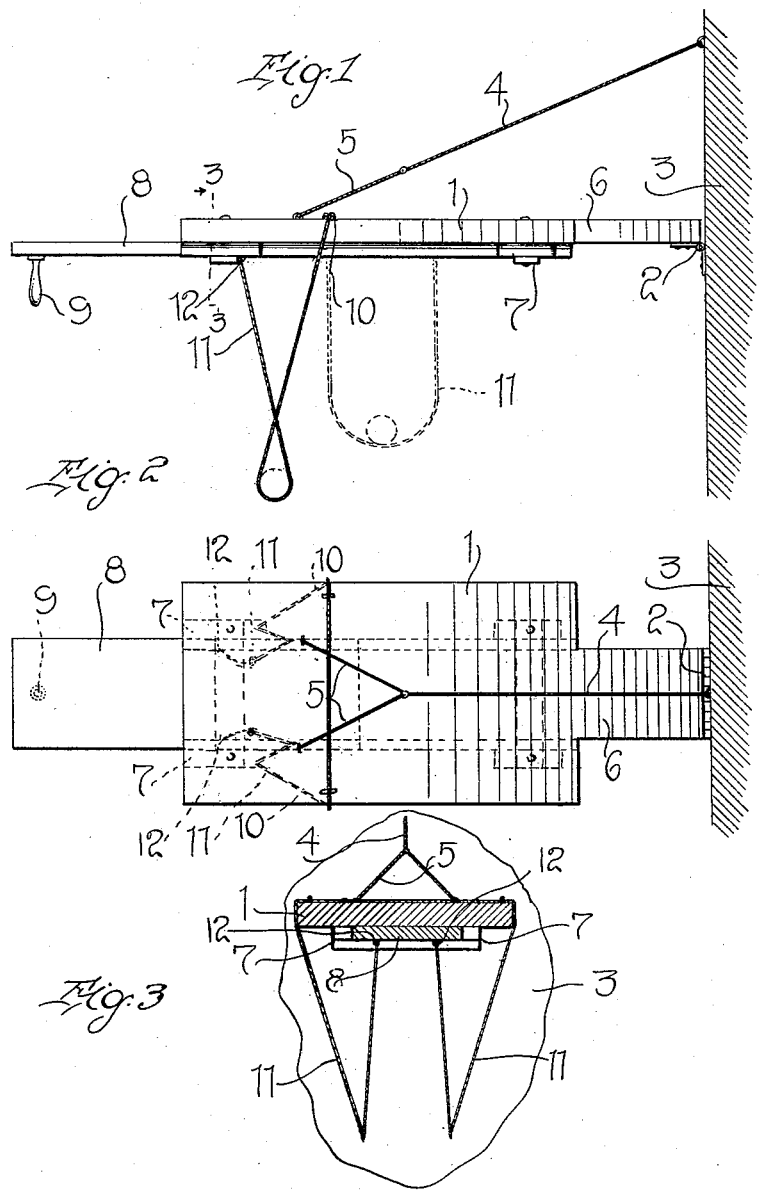
Inventor
BERNARD E. BIGGER
Witnesses
Robert M. Sutphen
A. D. Hind
By Watson E. Coleman
Attorney

UNITED STATES PATENT OFFICE.

BERNARD E. BIGGER, OF FONDA, IOWA.

SEED-CORN STRINGER.

1,111,207.   Specification of Letters Patent.   Patented Sept. 22, 1914.

Application filed January 31, 1914.   Serial No. 815,716.

*To all whom it may concern:*

Be it known that I, BERNARD E. BIGGER, a citizen of the United States, residing at Fonda, in the county of Pocahontas and State of Iowa, have invented certain new and useful Improvements in Seed-Corn Stringers, of which the following is a specification, reference being had to the accompanying drawings.

This invention relates to new and useful improvements in seed corn stringers and relates particularly to a device for suspending seed corn from any suitable support, so that the same may be readily dried before being placed within the crib, the main object of the invention being to provide a seed corn stringer which is hingedly secured to the side of the crib and supported in a suitable manner in a horizontal position and is provided with means whereby the corn may be readily strung and supported therefrom.

Another object of the invention is to provide a seed corn stringer of the above character which will possess advantages in points of efficiency and durability, is inexpensive to manufacture and at the same time is simple in construction and operation.

With the above and other objects in view, this invention consists in the novel features of construction and the combination and arrangement of parts to be hereinafter more fully described, pointed out in the claims and shown in the accompanying drawing in which, Figure 1 is a side elevation illustrating the application of my improved seed corn stringer. Fig. 2 is a top plan view, and Fig. 3 is a transverse sectional view taken on the line 3—3 of Fig. 1.

In carrying out my invention, I provide a main supporting board 1 which is hingedly connected, as shown at 2, to the side of the corn crib 3. This supporting board 1 is retained in a horizontal position by means of the rod 4, the upper end of which is connected to the side of the crib, and the lower end thereof is connected to the medial portion of the yoke 5, the ends of which are secured to the upper face of the board. It will be noted from the accompanying drawings that the inner end of the board 1 is provided with a reduced portion 6 to which the hinge 2 is connected.

Slidably mounted within the guides 7 upon the under face of the board 1 is the actuating bar 8, the outer end of which is provided with a suitable handle 9, which may be applied to the bar in any desired manner. Arranged upon opposite sides of the actuating bar 8 and disposed upon the upperside of the board 1 are the staples 10 and connected at one end to the staples are the strings 11, upon which the seed corn is to be strung. The other ends of the strings are secured to the spaced hooks 12 carried by the movable actuating member 8, the ends of the strings secured to the hooks 12 passing between the ends of the strings which are secured to the staples 10 upon longitudinal movement of the bar 8.

In the operation of my improved seed corn stringer, it will be noted that upon longitudinal movement of the bar 8 the ends of the strings secured to the hooks 12 will pass backwardly and forwardly between the ends which are secured to the staples 10 and as the strings cross each other, the ears of corn are placed between the strings and this operation is carried out until the entire string has been filled. It will be apparent that the strings may be of any desired length and are to be of suitable weight so that the various numbers of ears may be carried by one string. It will also be apparent from the drawing that when my device is not in use, the rod 4 may be readily detached from the crib 3 and the entire device be allowed to swing downwardly and remain against the side of the crib. The device in itself is extremely simple in construction and may be manufactured at comparatively small cost.

While I have shown and described the preferred form of my invention, it will be obvious that various changes in the details of construction and in the proportions may be resorted to for successfully carrying my invention into practice without sacrificing any of the advantages of the invention and without departing from the scope of the appended claims.

Having thus described my invention, what I claim, is:

1. A device of the class described including a horizontally mounted supporting board, means whereby to normally retain said board in a horizontal position, staples secured to the upper face thereof and arranged in spaced relation, spaced guide members secured to the under face of the board, an actuating bar movably mounted between said guide members, a handle carried by the bar to actuate the same, spaced lugs carried by said bar, and a string having one end secured to the hook upon one side of the bar and its other end extending upwardly over the supporting bar, and through the spaced staples, thence downwardly and secured to the hook upon the opposite side of the bar, from the first hook, as and for the purpose set forth.

2. A device of the class described including a horizontally mounted supporting board, a bracing rod whereby to normally support said board in a horizontal position, a movable bar arranged beneath said board, spaced hooks secured to the under face of said bar, a cord having one of its ends secured to one of the hooks and its other end passing upwardly over the supporting board, thence downwardly and secured to the hook upon the opposite side of the bar, whereby to provide loops suspended beneath the supporting board and the movable bar, and means whereby to actuate said bar, as and for the purpose set forth.

In testimony whereof I hereunto affix my signature in the presence of two witnesses.

BERNARD E. BIGGER.

Witnesses:
JOHN C. BIGGER,
I. P. LONGNECKER.

Copies of this patent may be obtained for five cents each, by addressing the "Commissioner of Patents, Washington, D C."